Dec. 12, 1944. H. J. BAUR ET AL 2,364,937
SIGNALING AND INDICATING SYSTEM
Filed Feb. 17, 1941 5 Sheets-Sheet 3

HUGO J. BAUR  INVENTOR.
THOMAS E. KULO
BY Edmund W. E. Kamm
ATTORNEY.

Dec. 12, 1944.  H. J. BAUR ET AL  2,364,937
SIGNALING AND INDICATING SYSTEM
Filed Feb. 17, 1941  5 Sheets-Sheet 4
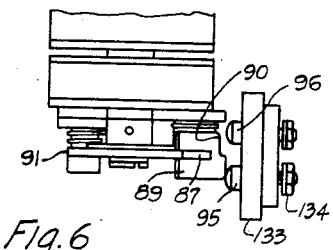
Fig.6
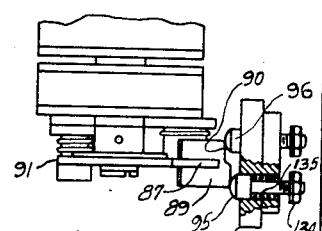
Fig.8
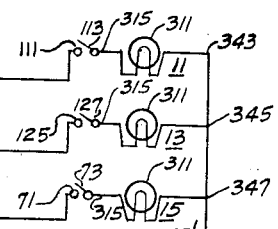
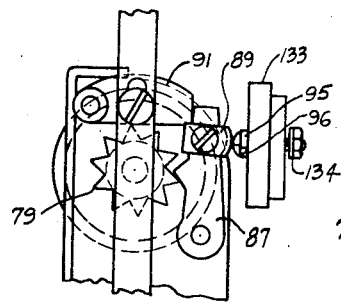
Fig.5
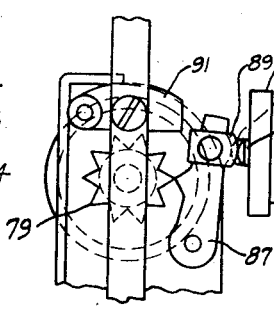
Fig.7
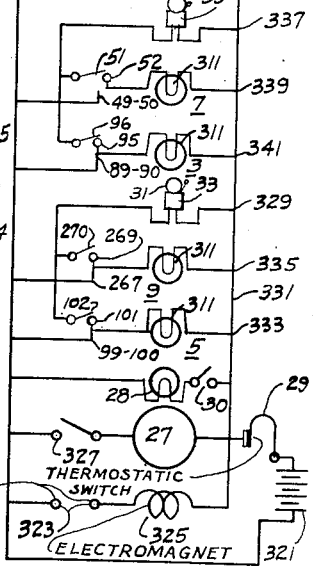
Fig.9
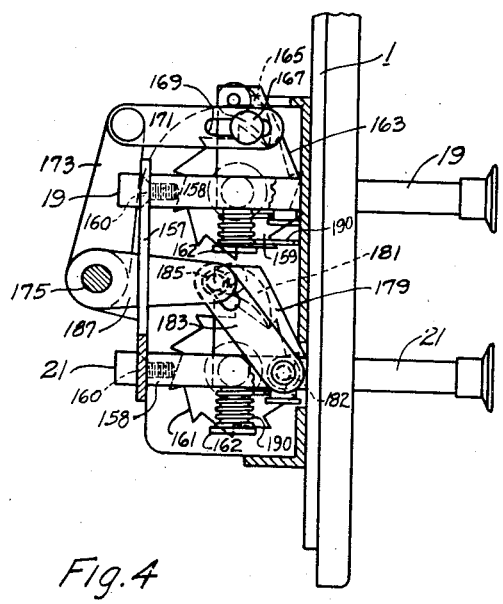
Fig.4
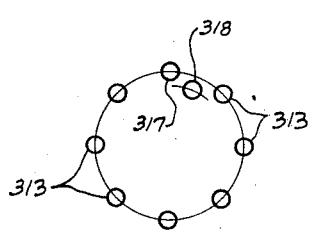
Fig.12
HUGO J. BAUR
THOMAS E. KULO   INVENTOR.
BY Edmund W. E. Kamm
ATTORNEY.

Dec. 12, 1944. H. J. BAUR ET AL 2,364,937
SIGNALING AND INDICATING SYSTEM
Filed Feb. 17, 1941 5 Sheets-Sheet 5
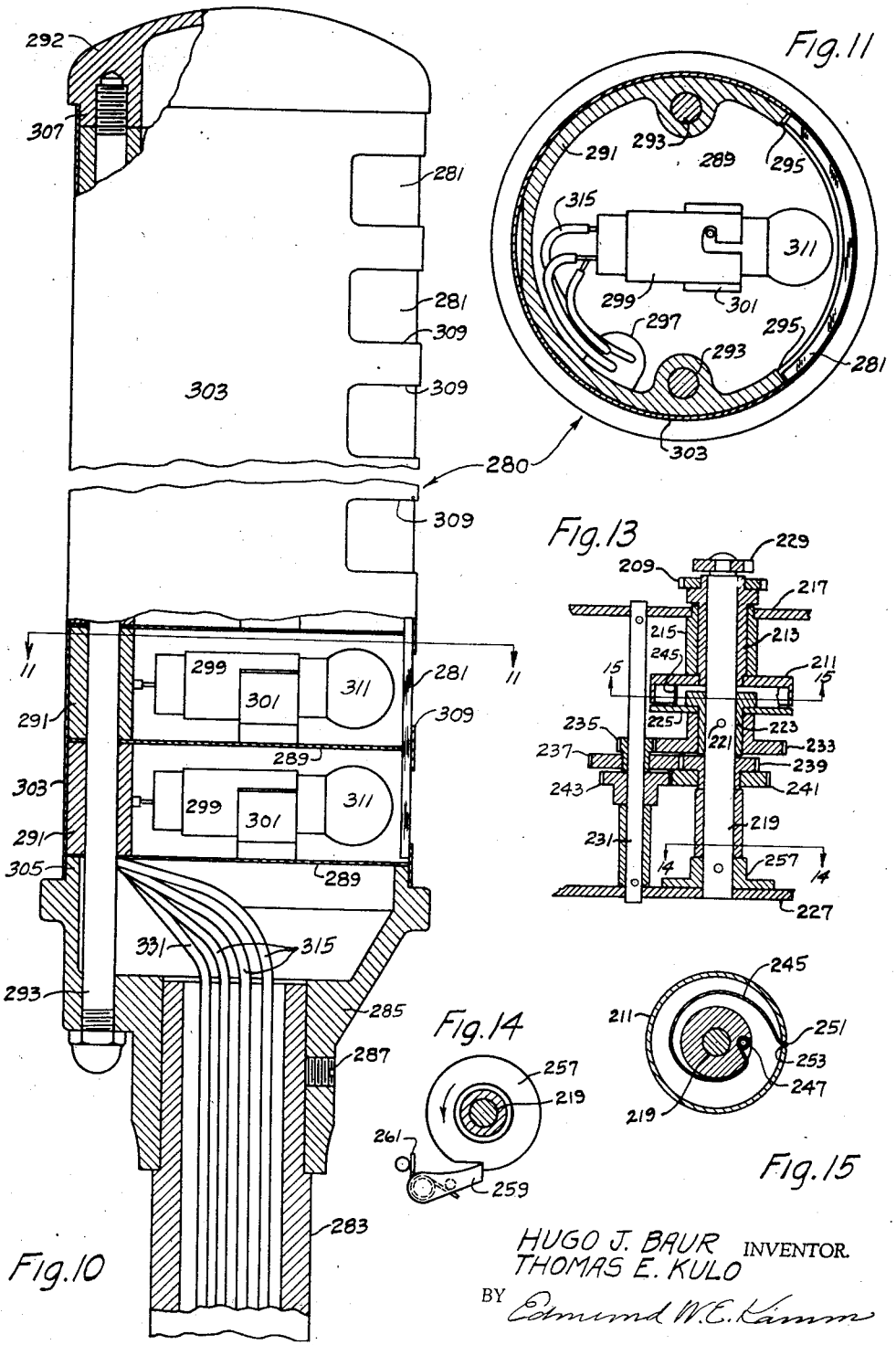
HUGO J. BAUR INVENTOR.
THOMAS E. KULO
BY Edmund W. E. Kamm
ATTORNEY.

Patented Dec. 12, 1944

2,364,937

UNITED STATES PATENT OFFICE

2,364,937

SIGNALING AND INDICATING SYSTEM

Hugo J. Baur and Thomas E. Kulo, Chicago, Ill., assignors, by mesne assignments, to City National Bank and Trust Company of Chicago, Chicago, Ill., as trustee Application February 17, 1941, Serial No. 379,378

6 Claims. (Cl. 177—311)

This invention relates to fare registering mechanisms in which a fare or fares made up of a check or a multiple thereof, are registered upon appropriate cyclometers and upon a display signal device which is visible to the customers and which, in addition, gives an audible signal in the case of certain fares. Provision is also made for the manual registration and indication of certain fares.

This application is a continuation in part of the application Serial Number 350,312 filed August 3, 1940, by the applicants herein.

It is an object of this application to provide a fare registering mechanism in which a plurality of cyclometers are provided for registering various fares which are accepted either mechanically, as by the mechanism disclosed in our above mentioned application, or manually by the operator.

It is another object of the invention to provide signaling means which is visible to passengers of a public vehicle which indicates the fare paid by the last passenger to board the vehicle.

It is another object of the invention to provide audible signal means which by the number of signals and the tone thereof indicates the number and type of fares paid, within limits.

Another object of the invention is to provide means for maintaining the indication of the last fare paid until the next fare is registered, whereupon the new indication is maintained.

It is still another object of the invention to provide means for clearing the existing indication prior to setting up another.

It is yet another object to provide means for delaying the audible signal means where successive signals are required.

A further object of the invention is to provide means for clearing the audible signal means, while maintaining the visible signal corresponding to the last paid fare.

It is a further object of the invention to provide a visual fare indicating means which is lighted so as to flash the indication from an advantageous position.

These and other objects of the invention will become apparent from a study of the specification in connection with the drawings which are attached hereto and which form a part thereof, in which:

Figure 4 is a view taken on the line 4—4 of Figure 1 showing the manual cyclometer operating mechanism.

Figure 5 is a detailed view showing a visual and audible indicator switch in the circuit holding position.

Figure 6 is a top view of the mechanism of Figure 5.

Figure 7 is a view of the mechanism of Figure 5 in the fully actuated position in which it operates both the visual and audible indicators.

Figure 8 is a top view of the mechanism in the position of Figure 7.

Figure 9 is a wiring diagram of the entire apparatus.

Figure 10 is a view partly in section, showing the visual indicating mechanism, with the tie rods shown out of their normal position for clarity.

Figure 11 is a sectional view taken on the line 11—11 of Figure 10.

Figure 12 is a diagram of the plug-in connection between the lamp post and the remainder of the wiring leading to the switches.

Figure 13 is a detailed view of the delayed action mechanism.

Figure 14 is an elevation of the ratchet and pawl taken on line 14—14 of Figure 13.

Figure 15 is a detail showing the spring connections of the mechanism of Figure 13 taken on the line 15—15 of that figure.

Figure 1:
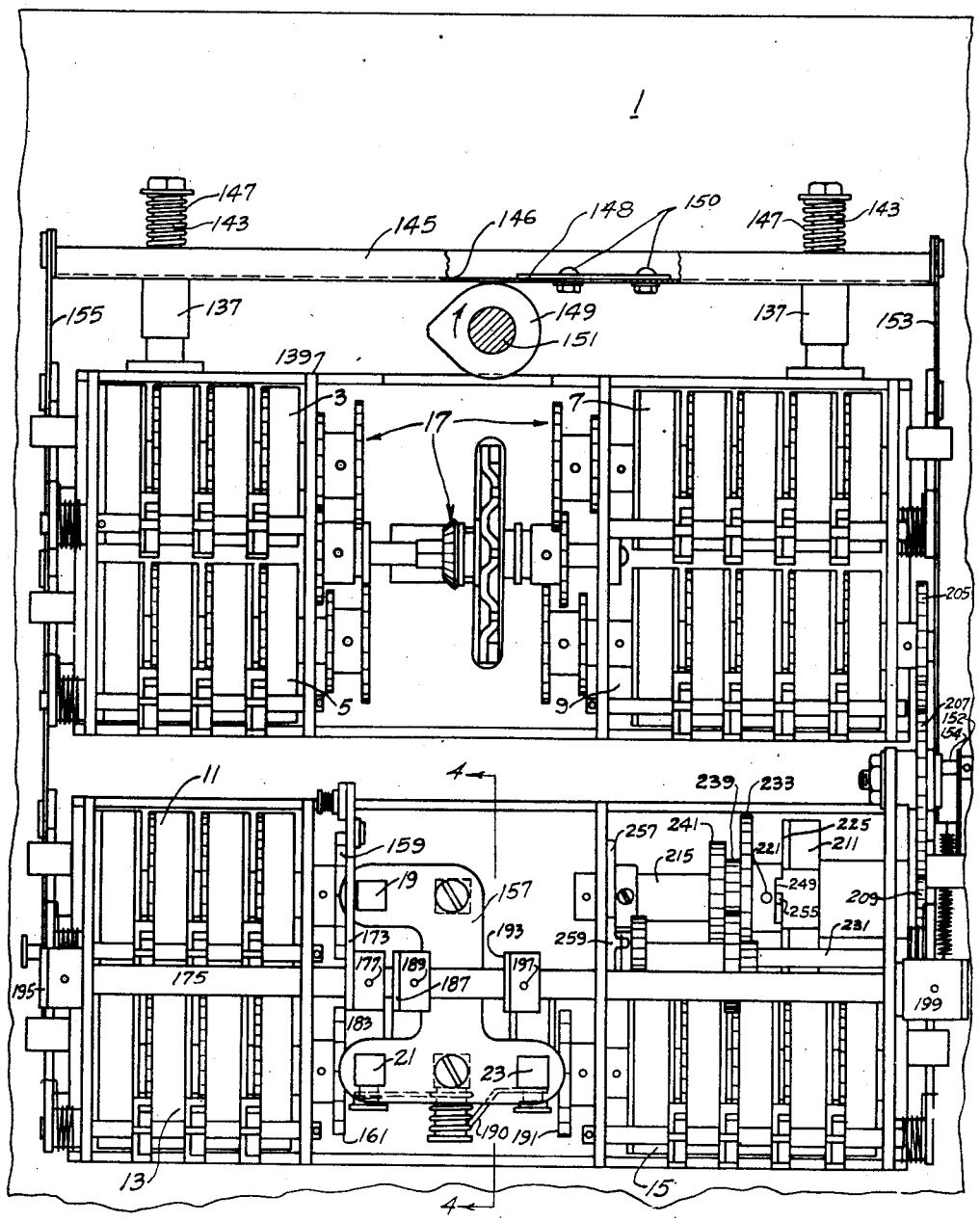
Figure 1 is an elevation showing the registers and their actuating mechanisms from the rear.

Referring to Figure 1, the numeral 1 indicates a front plate upon which the various cyclometers and their operating parts are mounted. The cyclometers are indicated by the numerals 3, 5, 7, 9, 11, 13 and 15 respectively. The first four are mechanically operated by gearing indicated generally by the numeral 17 as is fully disclosed in our co-pending application identified above. The last three cyclometers are manually operated by means of the push rods 19, 21 and 23 shown in Figures 2, 3 and 4.

Figure 2:
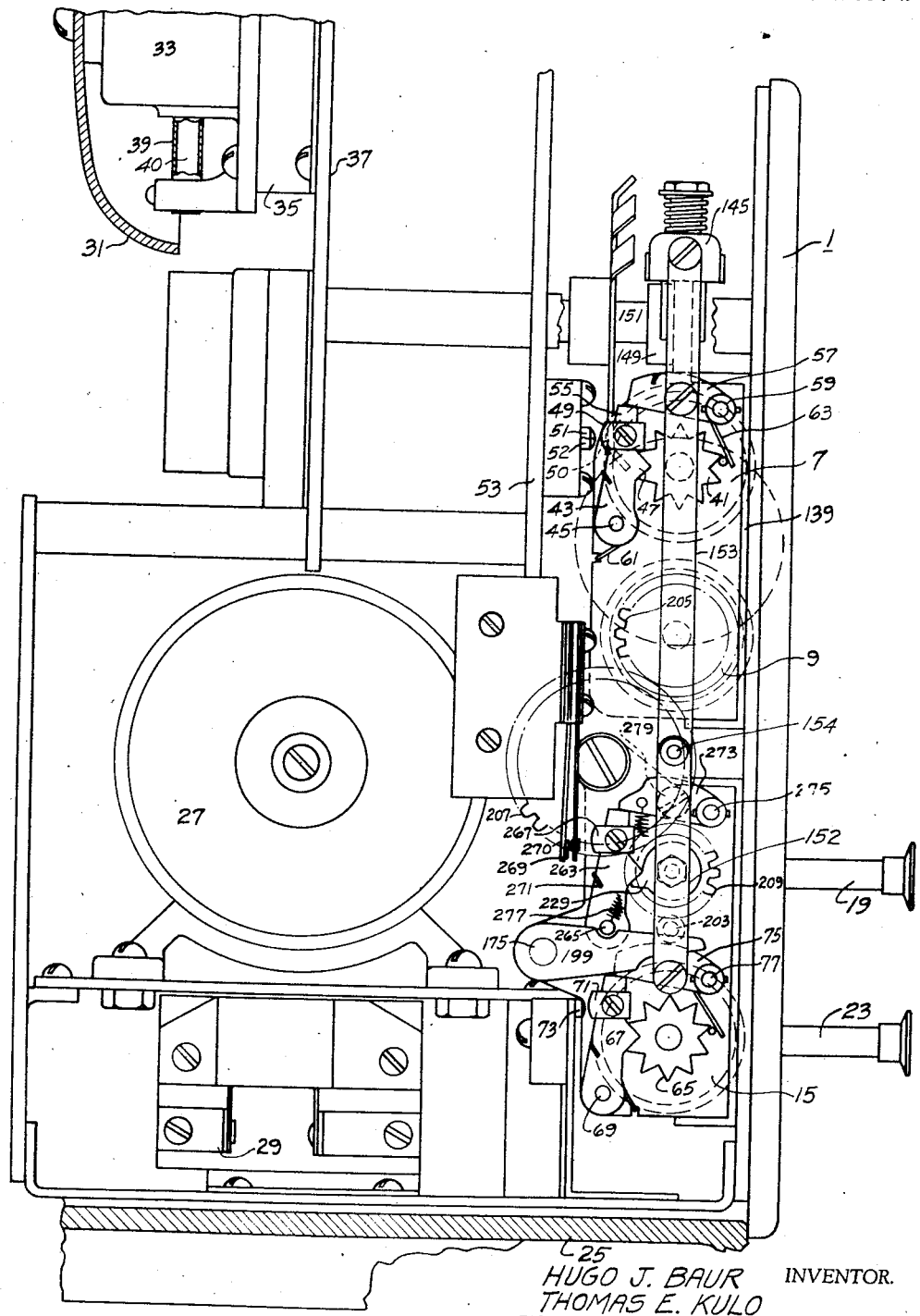
Figure 2 is a side elevation taken from the right of Figure 1 showing the switches, switch actuators and the audible signal means.

The front plate is mounted on a base 25 (Figure 2). Also mounted upon the base is a motor 27 for driving the fare registering mechanism, a temperature actuated circuit breaker or thermostatic switch 29 for preventing the overheating of the motor, and a pair of bells of different tones, only one of which is shown and referred to by numeral 31.

The bell 31 is mounted on a housing which encloses a solenoid 33 and which is in turn mounted upon a bracket 35. The latter is mounted on frame member 37 which is supported upon the base 25 in the manner shown in Figure 2. A sleeve 39 forms the core of the solenoid and serves to guide a cylindrical armature 40 which is drawn upwardly when the solenoid is energized to strike the bell and thus produce an audible signal. The armature is returned by gravity. The second bell mechanism is similarly constructed and mounted.

The register 7 (Figure 2) is adapted to accumulate one type of fare represented by a check, for instance a school fare, and the lowest order wheel is adapted to be advanced one full step, that is, one-tenth of a revolution for each such fare collected. This fare will be a single check and will operate the mechanism, disclosed in our prior application, to effect a one-position advance of this register. The ten-tooth ratchet 41 (Figure 2) will be advanced one tooth. A pawl 43 is pivoted at 45 and carries a tooth 47 which is in engagement with the teeth of the ratchet. The pawl carries at its upper end a contact piece 49 which is adapted to be pressed into engagement with a yieldably mounted contact 51 which is supported on a frame member 53. The pawl projects upwardly beyond the contact 49, as at 55, and the projecting end is adapted to be engaged by a holding pawl 57 which is pivoted at 59 on the cyclometer frame.

The pawl 43 is urged toward the ratchet by a spring 61 while the holding pawl 57 is urged into engagement with the upper end of pawl 43 by means of a spring 63.

The cyclometer 9 is also power operated and is adapted to register the cash fares collected mechanically. Its mechanism is somewhat involved and it will be described below.

The cyclometer 15, also shown in Figure 2, is hand operated and has a ten-tooth ratchet 65 connected to be driven by the lowest order indicator wheel. The ratchet is advanced one tooth for each single actuation of the register. The pawl 67 pivoted at 69 carries a contact piece 71 which cooperates with contact 73 to close a circuit as will be described. A holding pawl 75 is pivoted at 77 and is spring biased for engagement with pawl 67 while the latter is spring biased for contact with the ratchet. This cyclometer is preferably used to register the transfers received.

Figure 3:
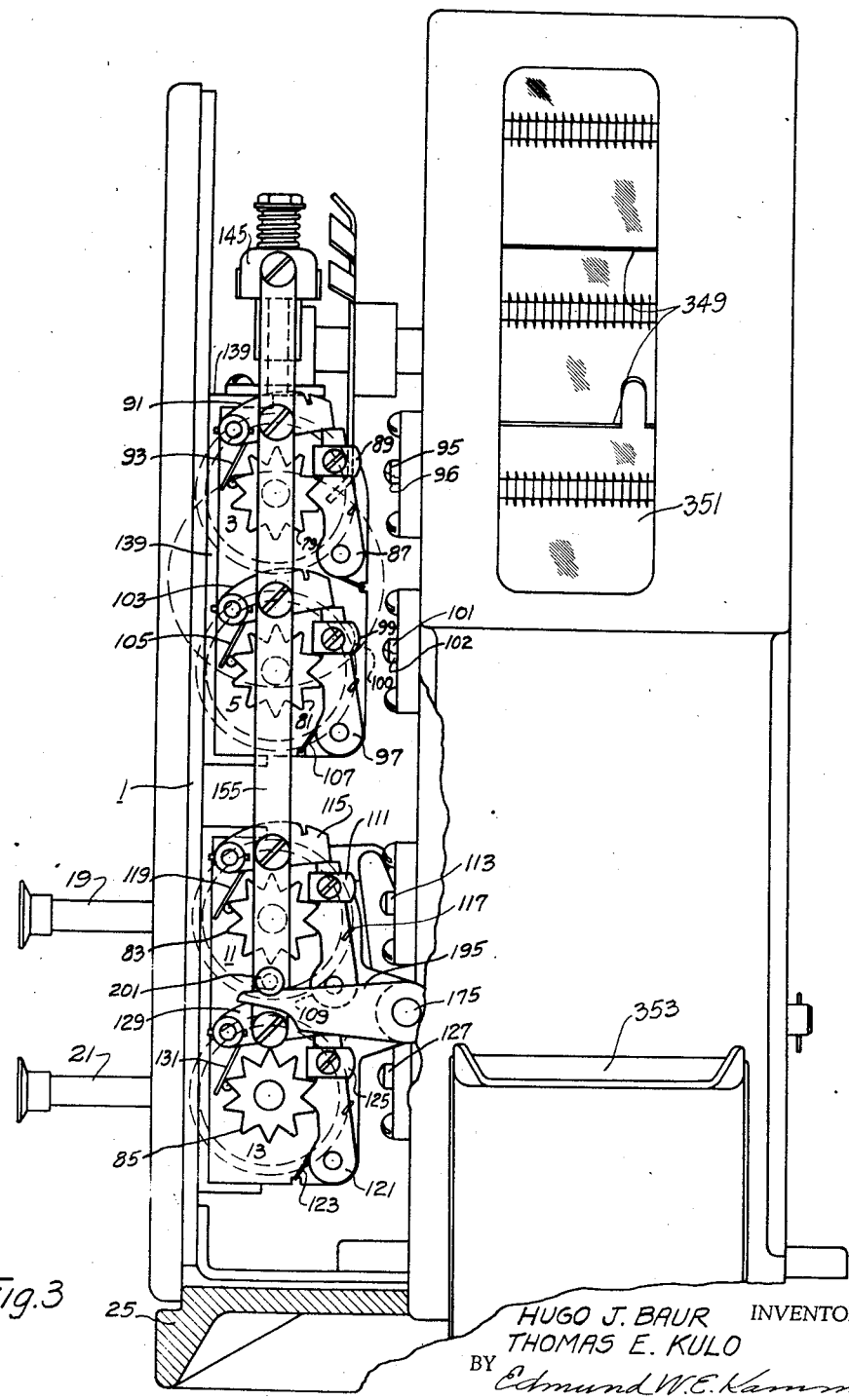
Figure 3 is a side elevation taken from the left of Figure 1 showing additional switches and switch actuators as well as the check display mechanism.

Referring now to Figure 3, the cyclometers 3, 5, 11 and 13 are each provided with ten tooth ratchets 79, 81, 83 and 85 respectively, each of which is connected to be driven one tooth distance when the lowest order register wheels are advanced a unit distance.

Cooperating with the ratchet 79 is a pivoted pawl 87 which carries a contact piece 89 at the upper end. This contact piece cooperates with the contacts 95 and 96 which are supported on the frame (see Figures 5 to 8). The top of the pawl is adapted to be engaged by the holding pawl 91 which is normally urged into contact with pawl 87 by spring 93.

Similarly, the ratchet 81 actuates pawl 97 which is urged into engagement with the ratchet by spring 107 and which carries contact piece 99. The latter is adapted to engage contacts 101 and 102. The holding pawl 103 is urged into holding relation with the pawl 97 by spring 105.

For the register 11, a pawl 109 urged by spring 117 into engagement with ratchet 83, carries a contact 111 which coacts with contact 113. A holding pawl 115 operated by spring 119 coacts with pawl 109.

Cooperating with ratchet 85 is pawl 121 which is urged into contact with the ratchet by a spring 123 and which carries contact 125 in a position to cooperate with contact 127. The holding pawl 129 is urged into contact with pawl 123 by spring 131.

The structure of the electric contact mechanisms of the registers 3, 5, 7 and 9 can be better understood by referring to the Figures 5 to 8 inclusive, which disclose further details of register 3. It will be seen from Figures 6 to 8 that a second contact 96 is provided on the same level as the contact 95 and that the contact piece 89 is wide enough to actuate both contacts 95 and 96 although it is recessed as at 90 adjacent the contact 96.

It will also be seen from Figure 8 that the contacts are movably mounted in the supporting member 133 and are yieldably urged toward contact 89 by spring 135 and are held against movement beyond a predetermined outer position by the element 134. Further, it will be seen from Figures 7 and 8 that when the pawl 87 is fully actuated by its ratchet 79, the contact 89, 90 will contact both 95 and 96 and that the pawl 87, when fully actuated, moves beyond the tip of pawl 91 so that the latter may be forced down behind the pawl 87. Thus when the latter is released by the ratchet 79, it cannot return to its original position but must be stopped by the pawl 91 in the position of Figures 5 and 6. Inspection of these figures shows that the contact 90 has released contact 96 but that the contact 95 has not been released. The purpose of this structure will be disclosed below.

Referring now to Figure 1, two posts 137 are mounted upon the frame member 139. The posts comprise projecting guides 143 on which is mounted an actuator bar 145. Springs 147 are disposed on the guides above the bar 145 and are held in place by suitable screw fastenings. A cam 149 is driven by a shaft 151 and by mechanism described in our application referred to above. The shaft corresponds to the shaft numbered 88 in said application.

As is clearly shown in Figure 1, a portion of the lower surface of bar 145 is cut away as at 146 and fixed to the surface is a cam follower 148 which is adjustable longitudinally and which is held in adjusted position by the screws 150. Movement of the follower changes the point of contact with the cam and thus alters the timing.

Connected to the ends of the bar 145 are the links 153 and 155. The link 153 is pivotally connected to holding pawl 57 and at 154 to an extension link 152 which is pivotally connected to holding pawl 75 shown in Figure 2, while the link 155 is pivotally connected to each of the holding pawls 91, 103, 115 and 129 shown in Figure 3. Thus when the cam 149 is rotated, it will lift bar 145 and the links so that all of the holding pawls will be lifted out from behind the ratchet operated pawls so that the latter may be returned to their normal positions by their return springs as shown in Figures 2 and 3. As the cam moves away from follower 148, springs 147 return the bar to normal position.

It should be here noted that the switch contact mechanisms for registers 3, 5 and 7 are of the double contact type as shown in Figures 5 to 8 while the mechanisms for the registers 11, 13 and 15 have only a single contact similar to 55 of Figures 5 to 8 and a single contact similar to 89 of the same figures. Where double contact mechanisms are provided, there will be both audible and visual indication of the fare collected while only the visual indication will be had where only a single contact mechanism is utilized.

Referring now to Figures 1 and 4, it will be seen that the mechanism for operating the manually operable counters 11, 13 and 15 comprises a bracket 157 which is mounted on posts 158 by screws 160 and which with the front plate supports and guides the push rods 19, 21 and 23. The springs 190 are mounted on posts 162 which are set in posts 158. The ratchet 159 drives counter 11 while the ratchet 161 drives the counter 13 and the ratchet 191 operates the counter 15.

The push rod 19 carries a flat vertical projection 163 which has pivotally mounted upon it a pawl 165 which is adapted to actuate the ratchet 159. The plate also carries a headed pin 167 which operates in a slot 169 in a link 171. The link is pivoted to a lever 173 which is pinned to a shaft 175 at 177. The pawl 165 rides over ratchet 163 on the inward stroke of the push rod and actuates the ratchet through one division on the outward stroke.

The push rod 21 carries a plate 179 upon which is pivotally mounted a pawl 181 which is adapted to actuate the ratchet 161 upon each operation of the push rod. Pivotally connected to the push rod at 182 is a link 183 which is slotted at its opposite end to receive a headed pin 185 in a crank arm 187 which is also pinned to the shaft 175 at 189. A similar arrangement connects the push rod 23 to actuate its ratchet 191 and the crank arm 193 which is also pinned to the shaft 175 at 197.

In each case the push rods are returned to their normal positions by spring 190 and the pawls ride idly over the ratchet teeth on the inward stroke of the ratchets and engage the ratchets to drive them upon movement toward the outermost or starting position.

The shaft 175 is provided at its ends with levers 195 and 199 respectively, Figures 2 and 3. Lever 195 engages a pin 201 set in link 155 while lever 199 engages a pin 203 which is set in the link 152. The last named link is pivotally connected with link 153 at 154 and both links 153 and 155 are connected to the ends of the bar 145. Thus when shaft 175 is rotated to raise the ends of the levers 195 and 199 the bar 145 will be raised to reset the latch pawls 57, 273, 75, 91, 103, 115 and 129 described above. The shaft 175 and its arms just described perform the same function as the cam 149 except that they function only when the manual registers are operated and the cam functions when the mechanically actuated registers are operated.

Reverting now to the description of the cyclometer 9, special provision must be made for the operation of indicating mechanism for this register because of the possible ways in which it may be operated. In the apparatus described in our prior application, a number of checks may be inserted at one time in the machine and each check is registered separately. However, if a plurality of cash fares is paid by means of a plurality of coins all of which are deposited at one time, then it becomes necessary to give the indications corresponding to the fares paid regardless of the order of registration of the coins. For instance, let us suppose that the fare to be paid is a six cent one, and two fares could then be paid by depositing two pennies and a dime. Let us assume that the coins are deposited in this order and as the first penny is registered on the cyclometer, there has not been payment sufficient to require a signal. The same is true at the completion of registration of the second penny. However, as soon as the dime is registered, two indications are required. The signal control mechanism being in this case operated by power, operates so quickly that there would be a blurring or merging of the two signals such that it would be impossible to distinguish between them. To prevent this result, a delay mechanism has been interposed between the register and the signal actuating mechanism so that the latter will function at a predetermined speed irrespective of the speed of operation of the cyclometer within limits. This mechanism also performs its function in the case where a single coin, for instance a dime, pays two fares. This would occur where a five cent fare prevails.

Referring to Figures 1, 2, 13, 14 and 15, it will be seen that the gear 205 which is connected to rotate at the same speed as the lowest order wheel of the cyclometer 9, drives, through an idler gear 207, a gear 209 which is connected to actuate a spring casing 211 (Figure 13). The gear and casing are fixed to opposite ends of a hub 213, which is journalled in a hub 215 fixed in a frame member 217. A shaft 219 is journalled for free rotation inside the hub 213 and gear 209 and has pinned to it at 221 a hub 223 which has fixed to it a spring case covering flange 225. The one end of the shaft is rotatably mounted in the frame 227 while the other end has fixed to it the single lobed cam 229. A countershaft 231 is also mounted in the frame members 217 and 227.

Mounted on the hub 223 is a gear 233 which will rotate with the hub because it is pinned by pin 221. This gear meshes with a gear 235 on the countershaft which is fixed to a gear 237. The latter gear meshes with a gear 239 which carries a gear 241 on its hub and which rotates freely on the shaft 219. Gear 241 meshes with a gear 243 which turns on the countershaft. The gears 233, 237 and 241 are larger than their respective intermeshing gears and gears 237 and 241 are larger than their gears upon which they are mounted so that there will be an increase in the speed of rotation from gear 233 to gear 243. The gear set acts as a drag or brake upon the rotation of the shaft 219.

A spring 245 has one end 251 curled over or provided with an enlarged section which is received in a bevelled edge slot 253 in the spring case. The other end of the spring is looped around a pin 247 which is set within a hole in hub 223. This hole is parallel to shaft 219 and is connected to the exterior of the hub by a saw slot. Thus the rotation imparted to the spring case 211 by the gear 209 will tend to wind the spring as is clearly shown in Figure 15, and the shaft will be urged in the same direction by the spring but its motion will be retarded by the drag of the gear set so the cam 229 will be driven at a lesser speed.

As is clearly shown in Figure 1, the spring case 211 carries a stop 249 which is adapted to contact a radial stop 255 on the cover 225 so that an initial tension may be maintained on the spring 245 and so that the shaft 219 will not move a distance greater than gear 209.

The shaft 219 is also provided with a single toothed positioning disc 257. A pawl 259 is placed to retain the shaft in a predetermined position, that is, to prevent backward rotation thereof beyond this position. The operating rotation of the ratchet carrying shaft is shown in Figure 14. A spring 261 which bears at one end against a pin set in plate 227 and at its other end upon the pawl, holds the pawl in engagement with the ratchet.

Referring now to Figure 2, the cam 229 is adapted to actuate a pawl 263 which is pivoted at 265 and which carries a switch operator 267 which is adapted to close the contacts 269 and 270 of the switch. A spring 271 urges the pawl toward the cam and a holding pawl 273 is pivotally mounted at 275 and is adapted to be drawn down behind pawl 263 as the latter is actuated by the cam. Elements 267 and 269 form one switch while elements 269 and 270 form another. Thus when the pawl 263 is in fully actuated position, both switches will be closed but only one switch will be held closed when the pawl 263 returns to the position determined by the holding pawl. A spring 277 actuates the holding pawl and a pivot screw 279 connects the pawl to the reset link 152 so that the pawl will be reset in the same manner as the other pawls described above.

The gearing 205, 207, 209 must be suited to the particular fare which is to be registered. That is, if the prevailing fare is a five cent one, the cam 229 must be rotated twice for a ten cent advance of the register whereas if the prevailing fare is a six cent one, the cam will have to be given two revolutions for a twelve cent advance of the register, so that the gearing must effect a greater reduction in the case of a six cent fare than in the case of a five cent fare. Each division of the lowest order wheel on cyclometer 9 represents one cent.

Visible indicator

In Figures 10 and 11 is shown a signal lamp which is indicated generally by the numeral 280 and which comprises a hollow post 283, having a bottom head casting 285 fixed to the top thereof as by means of set screw 287. Mounted to rest on top of the casting is a partition 289 and resting upon the partition is a spacer section 291. Any desired number of partitions and spacer sections may be superposed one on the other and be capped by a top head 292. The partitions and sections are perforated to receive tie rods 293 which screw into the top head.

The spacer sections are cut away as at 295 so as to receive a transparency 281 upon which is indicated the various fares in opaque lettering. Each partition is cut away as at 297 to permit the passage of electric wires which are run to the lamp sockets 299 which are mounted in clips 301 mounted on the partitions.

A tubular housing 303 is slipped over the spacer sections and fits snugly over flanges 305 and 307 on the lower and upper heads respectively. The housing is cut away at 309 adjacent the lamps 311 to form windows.

The lower end of the tube 283 is provided with the well known multi-prong fitting which is adapted to be inserted in a socket. The plan of the fitting is shown in Figure 12 in which 313 represents prongs which are connected to wires 315 leading to individual lamps and 317 represents a prong connected to a wire 331 which is common to all of the lamps. The prong 318 prevents assembly of the socket in any but the intended way so that the proper lamps will be connected to their switches.

The transparency 281 may be of different colors at the various windows. Thus the registers 9 and 5 which register adult cash fares and adult token fares respectively may be of the same color, as for instance, green while the registers 3 and 7 which register childs fares and school tickets respectively may be of another color such as red. The hand operated cyclometers 11, 13 and 15 which may be used to register transfers, tickets and passes respectively may be white or, if it is desirable to distinguish between them, they may be colored in any suitable manner.

It is also desirable that the cyclometers 5 and 9, since they are used to register the same type of fare be caused to actuate a bell of the same tone while the registers 3 and 7 be caused to actuate a bell having a tone different from that of the first bell.

The signaling by means of lights and bells being organized in this way enables those passengers already seated in a conveyance to determine whether the proper fare has been paid by a passenger who has just boarded the vehicle. The significance of the colors and the bell tones is soon determined by people whose use the vehicle regularly and when an improper fare is accepted, it is at once known to the other passengers and any checkers who may be aboard the vehicle.

The wiring diagram shown in Figure 9 shows how the switches actuated by the various registers effect the desired signals. In this diagram are shown the battery 321, the thermostatic switch 29, the motor 27, a check gap 323, a clutch control coil 325, a control switch 327 all of which are described above or in our prior application identified above and have no particular bearing on this case except that the power operated registers are operated thereby.

The element 28 shown in Figure 9, is an inspection light which is disposed at the top of the check display mechanism disclosed in our copending application Serial Number 350,312, filed August 3, 1940. The light is used only after dark and is therefore controlled by a manually operated switch 30.

The solenoid 33 which operates one of the bells is connected at 329 to the battery lead 331 and on the other side to contact 102. A light 311 is connected at 333 to the lead 331 and at the other side to the second contact 101. The latter contact is disposed adjacent the projection on the contact 99 which is mounted on pawl 97 while the bell contact 102 is adjacent the cut-away portion thereof. The pawl contact is grounded on the mechanism of the machine which is connected to the other side of the battery so that a circuit will be completed when the contacts are made.

The solenoid is also connected with the contact 270 of the cash cyclometer switch while another light 311 is connected to the other contact 269 thereof and to the battery lead at 335. Thus the switch 99—101—102 of cyclometer 5 will ring a bell and light one light while the switch 267—269—270 of the cash cyclometer 9 will ring the same bell and light a different light. As explained above however, the color displayed will preferably be the same.

The solenoid 33' of a differently sounding bell is connected at 337 to the lead 331 and at the other side to the contacts 96 and 51 of each of the switches of the registers 3 and 7 respectively. The other contacts 95 and 52 respectively of these switches are connected respectively to two other lights 311, which are connected to the lead 331 at 339 and 341. The contact piece 89—90 on pawl 67 of register 3 controls solenoid 33' and the light connected at 341 while the contact piece 49—50 on pawl 43 of register 7 controls the solenoid and the other light.

The hand cyclometer 11 has a single contact 113 associated with it which is contacted by the contact 111 on pawl 109. Said single contact is connected at one side to another lamp 311 the other side of which is connected at 343 to the battery lead 331. This register is preferably used to register passes although it may obviously be used to count any other type of fare. The color of the transparent window adjacent the light 311 for this register is preferably white.

The manually operated cyclometer 13 has a single contact 127 which is rendered active upon contact by the element 125 upon operation by the ratchet 85. These contacts adapted to connect a lamp 311 which has one side connected at 345 to lead 331, to the other side of the battery. This register may be used to indicate tickets which are received by the operator and the lamp 311 will illuminate a white window in the preferred form.

The ratchet 65 of register 15 causes the contact 71 to engage contact 73 and as shown in Figure 9, these contacts control another lamp 311 and serve to connect one side thereof to the frame while the other side of the lamp is connected at 347 to the battery lead 331. The window associated with the lamp in this circuit may also be white and may be lettered to indicate that the receipt of a transfer has been registered.

The element 349 shown in Figure 3 represents a plurality of shelves upon which the checks accepted and registered by the machine and added on the machine operated cyclometers, are displayed for inspection by the operator. The element 351 is a transparent window which covers the shelves. 353 represents the check discharge chute. These mechanisms are fully described and claimed in our co-pending application Serial Number 379,379, filed February 17, 1941.

*Operation*

Upon the insertion of a check in the machine, the mechanism disclosed in our previous application will function to advance the proper register 3, 5, 7 or 9 the required amount. In accomplishing this work and before the registration is applied to the proper register, the shaft 151 and cam 149 will be actuated to clear any signal light which is lighted to indicate the preceding fare. This is accomplished by bar 145, links 152, 153 and 155 which lift the holding pawls out from behind the switch actuating pawls all as described above. The bar 145 is returned to normal before the high points on the ratchets pass the contact pawls.

Thereafter, the registration is applied to the proper register and the ratchet of this register will be rotated a step, will actuate the associated switch pawl to its full extent and will pass the tooth on the pawl so that the latter may return toward its original position. This return is however, prevented by the associated holding pawl. During the forward movement of the switch pawl the proper lamp and bell will be actuated. As the switch pawl backs away, the bell contact will be broken but the lamp contact will be maintained until a succeeding operation of the machine is effected.

When a manual register such as 11, 13 or 15 is actuated, the inward stroke of the operating push rod will actuate levers 195 and 199. These levers will lift links 152, 153 and 155 to withdraw the holding pawl which may be in position behind a switch actuating pawl, so as to clear the signal lamps and thereafter upon the outward or operating stroke, the switch actuating pawl will close the associated switch and will energize the proper signal lamp. This indication will be held until the succeeding operation of the machine is effected, either by the automatic or the manual mechanisms.

It will be seen from Figure 1 that the registers 11, 13 and 15 are operated by manually actuated push rods 19, 21 and 23 respectively.

As fully described above, if a cash deposit is made which is the equivalent of several fares, these fares will be registered in succession. Even if the fares are so paid that they are registered almost simultaneously, the delay mechanism will separate the indication so that two distinct signals will be given.

When switch 327 is closed manually, the cam 149 will be rotated through a complete cycle as described in our previously described application, and will clear all signals without setting up a new one, since no check was inserted, for the evident purpose of ending all energy consumption as required when the vehicle is taken out of service.

While we have disclosed one embodiment of our invention for purposes of illustration and description, it is obvious that the construction and arrangement of parts may be changed and varied without departing from the spirit of the invention. We therefore do not wish to be limited to the specific form here disclosed, but desire protection falling fairly within the scope of the appended claims.

What we consider to be new and desire to protect by Letters Patent of the United States is:

1. In combination with a register, visible and audible indicating means, a control device for each indicating means, an operator for said control devices adapted to be actuated by the register, said operator having primary and secondary positions, said operator being constructed and arranged to actuate both control devices when it occupies its primary position and to actuate only one control device when it occupies its secondary position, a withdrawable abutment for holding said operator in said secondary position and means for withdrawing said abutment to permit the return of said operator to its primary position.

2. In a registering and signaling system, the combination of a register, means for actuating said register, a plurality of signals, a cam connected to be driven by said register, a cam follower provided with a plurality of projections of different lengths, movable abutments, one mounted for movement by each projection, said follower being movable by said cam to move said projections into engagement with said abutments and to thereafter separate said projections from engagement with said abutments in predetermined order, each abutment and projection comprising a switch, a circuit connecting each switch and a signal so that said signals will be actuated in like order.

3. In a registering and signaling system, the combination of power actuated registers and manually operated registers, a plurality of signals, an actuator device connected to be driven by each of said registers and operable thereby through a number of positions in a predetermined cycle, means, actuated by said actuator device, for actuating different signals at each position, means for holding an actuator device in one of its positions, resetting means for releasing said holding means, and manual and power means for actuating said resetting means.

4. The combination with a plurality of registers of power means for actuating certain of said registers and manual means for operating other of said registers, signal means associated with said registers and actuable thereby to indicate an operation thereof, releasable means for retaining said signal means in actuated, indicating condition, restoring means for releasing said retaining means to clear said signal means, and connections between said restoring means and both said power means and said manual register operating means for actuating said restoring means prior to the actuation of a register.

5. In a registering and signaling system the combination of a plurality of registers, register actuating means, a plurality of signal devices, control means for said signal devices comprising contact means mounted adjacent said registers, said contact means being operated by said registers, latch pawls for holding said contact means in operated position, means for withdrawing said pawls from holding position comprising a frame connected to all of the pawls, means urging said frame and pawls toward holding position, and means, actuated by said register actuating means prior to actuation of a register, for moving said frame and pawls from holding position.

6. In a registering and signaling system the combination of a register, register actuating means, signal means having control means comprising an upstanding contact lever adapted to be actuated by said register, a holding pawl disposed transversely of said lever near the upper end thereof, said pawl being adapted to rest upon the lever when the latter is not actuated and to drop to latching position behind the lever when it has been actuated to prevent its return to initial position, and means actuated by said register actuating means for withdrawing said pawl from latching position prior to operation of said register.

HUGO J. BAUR.
THOMAS E. KULO.